United States Patent [19]
Mooney et al.

[11] Patent Number: 5,524,061
[45] Date of Patent: Jun. 4, 1996

[54] DUAL MODE TRANSDUCER FOR A PORTABLE RECEIVER

[75] Inventors: Charles W. Mooney, Lake Worth; John M. McKee, Hillsboro Beach; Gerald E. Brinkley, West Palm Beach; Irving H. Holden, Boca Raton, all of Fla.

[73] Assignee: Motorola, Inc., Schaumburg, Ill.

[21] Appl. No.: 297,730

[22] Filed: Aug. 29, 1994

[51] Int. Cl.$^6$ ........................................... H04R 25/00
[52] U.S. Cl. ........................... 381/151; 381/193; 381/200; 381/203
[58] Field of Search ............................ 340/825.46, 311.1; 381/192, 68, 68.3, 152, 194, 199, 151, 193, 200, 203

[56] References Cited

U.S. PATENT DOCUMENTS

| | | | |
|---|---|---|---|
| 5,023,504 | 6/1991 | Mooney et al. | 340/825.46 |
| 5,107,540 | 4/1992 | Mooney et al. | 381/192 |
| 5,172,092 | 12/1992 | Nguyen et al. | 340/311.1 |
| 5,327,120 | 7/1994 | McKee et al. | 340/825.46 |

FOREIGN PATENT DOCUMENTS

3621133A1  1/1988  Germany .

OTHER PUBLICATIONS

Mechanical Vibrations, Fourth Edition, J. P. Den Hartog, pp. 370–373.

Primary Examiner—Forester W. Isen
Assistant Examiner—Duc M. Nguyen
Attorney, Agent, or Firm—Philip P. Macnak

[57] ABSTRACT

A dual mode transducer (600) includes an electromagnetic driver (604), an armature including upper and lower substantially parallel planar suspension members (610) coupled to the driver (604), and a magnetic motional mass (616) suspended between the suspension members (610). The suspension members (610) include a plurality of independent planar non-linear spring members (612) arranged regularly about the central region (614) within a perimeter region (608). The spring members (612) are defined by members having maximum opposing widths tapering to minimum opposing widths at midpoints thereon, the maximum opposing widths are coupled to the central region (614) and to the perimeter region (608). The motional mass (616) couples to the electromagnetic field which alternately moves the motional mass (616), the movement being transformed through the spring members (612) and the driver (604) into motional energy. A soundboard (1014), coupled to the driver (604), couples the motional energy to a user.

21 Claims, 8 Drawing Sheets

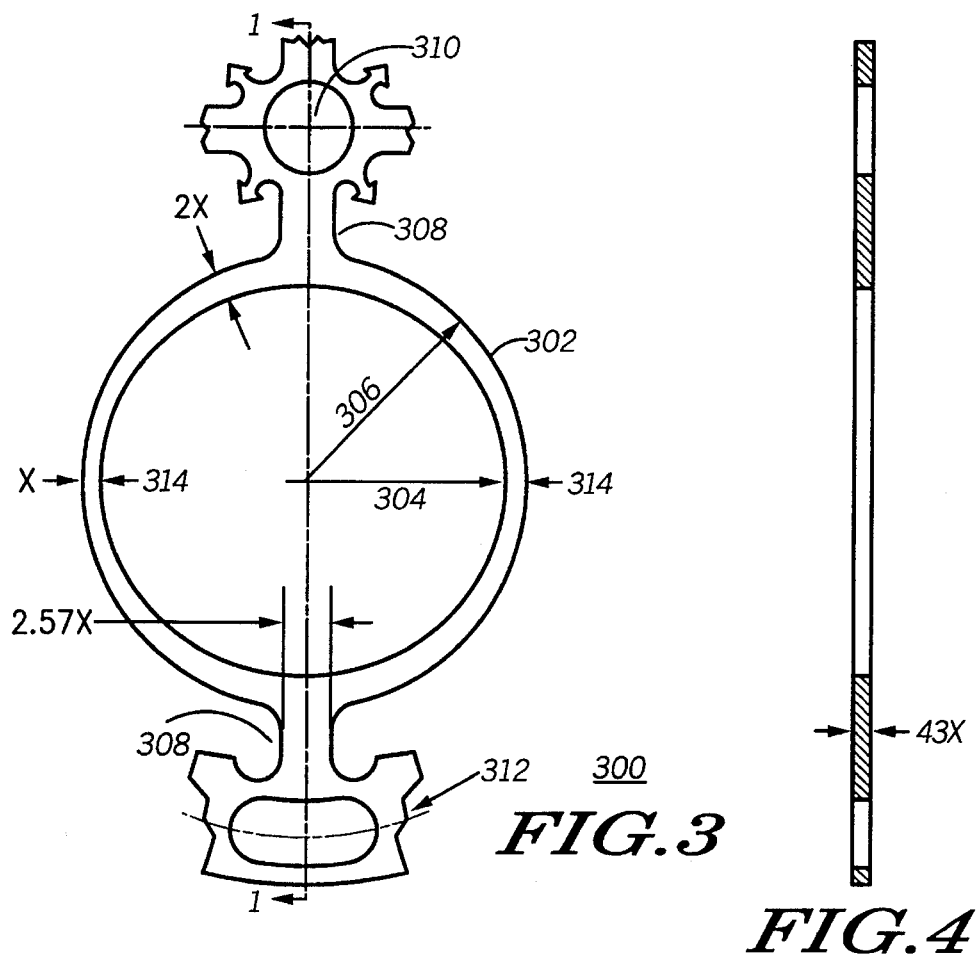
FIG.3
FIG.4
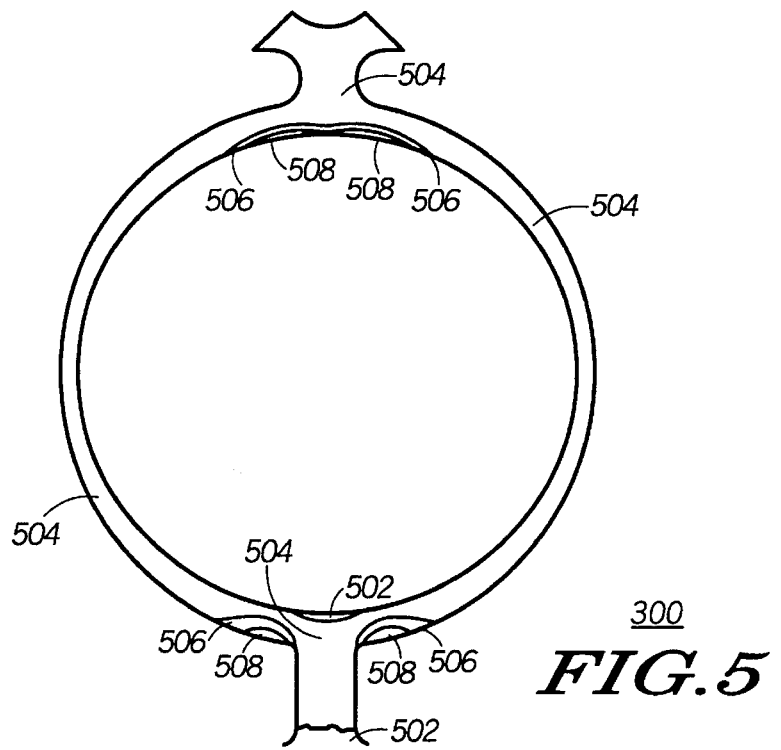
FIG.5

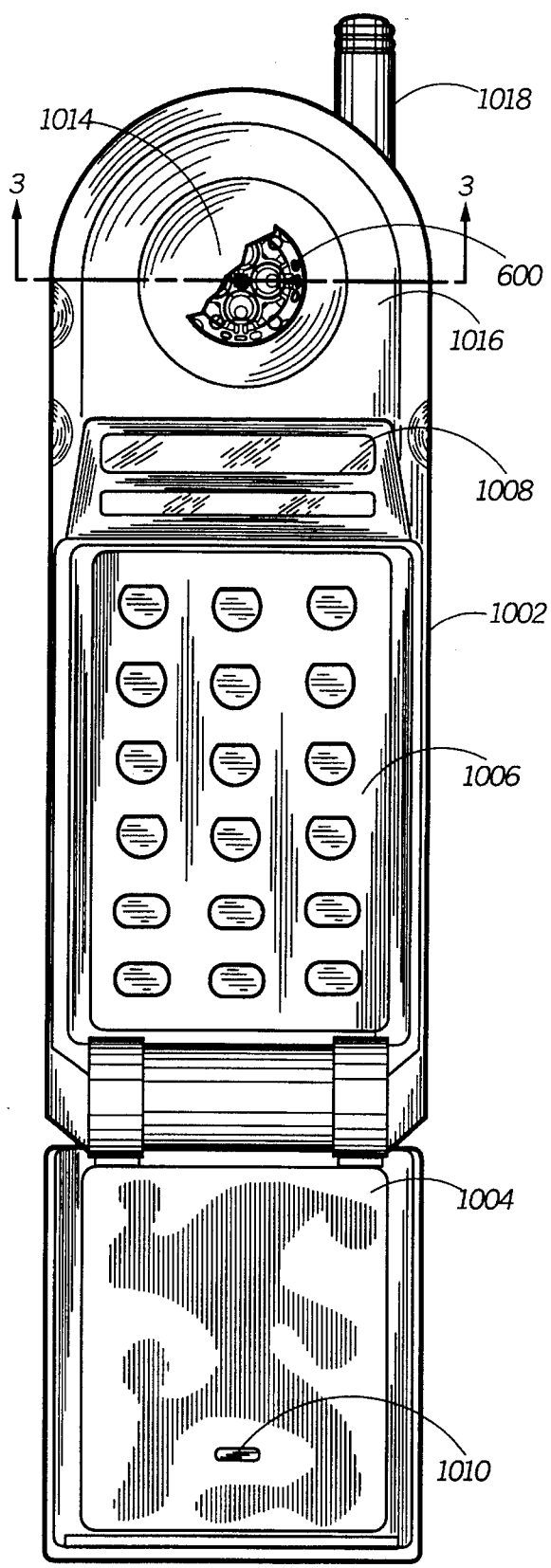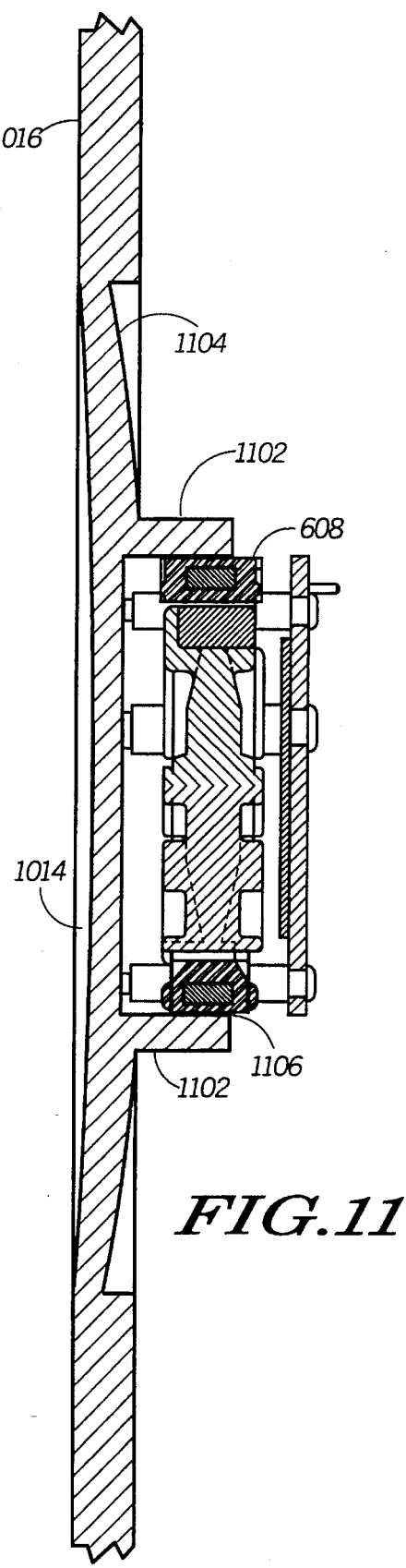
FIG.10
FIG.11

DUAL MODE TRANSDUCER FOR A PORTABLE RECEIVER

Cross Reference to Related Co-pending Applications

Related, co-pending applications include Patent Application, Attorney's Docket No. PT00515 V, filed concurrently herewith, by McKee, et al., entitled "Mass Excited Acoustic Device" and Patent Application, Attorney's Docket No. PT00529V, filed concurrently herewith, by Hertz, et al., entitled "Inertial Acoustic Pickup", both of which are assigned to the Assignee hereof.

Field of the Invention

This invention relates in general to electromagnetic transducers, and more specifically to an electromagnetic transducer comprising a resonant armature system which is used to selectively generate a tactile alert and a limited frequency range voice reproduction of an audible voice message signal.

BACKGROUND OF THE INVENTION

Portable radiotelephones, such as pocket-sized cellular telephones and second generation (CT2) cordless telephones are becoming increasingly more popular, especially as the size and the cost of the portable radiotelephones has been reduced. Current portable radiotelephones utilize an audible ringing signal to alert the portable radiotelephone user of an incoming call. There are, however, drawbacks to the use of an audible ringing signal. One such drawback is that when the portable radiotelephone is carried in a pocket, the audible ringing signal can become muffled, which can result in the portable radiotelephone user missing a call. Furthermore, there are many areas of public business, such as in theaters and in restaurants, where the use of devices providing an audible ringing signal are being banned, because the audible ringing signal is an annoyance to other customers at the establishment.

Tactile, or silent alerting devices have been utilized for some time in portable communication devices, such as pagers, to provide a vibratory alert signal. The tactile alerting device of choice in prior art portable communication devices has been a motor driven eccentric weight vibrator. While such motor driven eccentric weight vibrators have proved acceptable for use in some portable communication devices, they are generally unacceptable for use in current portable radiotelephones due to the increased space which is required to mount the motors. Also, most portable radiotelephones have only a very limited battery life, and the use of a motor driven eccentric weight vibrator which requires a significant current drain for operation would further reduce the operating time available for such portable radiotelephones.

What is therefore needed for use in a portable radiotelephone is a tactile alerting device which does not require any increase in space to mount the device, and furthermore does not provide a significant increase in current drain when being operated. What is further needed is a tactile alerting device which can be operated in a dual mode to provide not only a vibratory alert, but can also provide a limited frequency range voice reproduction of an audible voice message signal, thereby eliminating the need for a separate audio transducer.

SUMMARY OF THE INVENTION

In the preferred embodiment of the present invention a dual mode transducer comprises an electromagnetic driver, an armature, a magnetic motional mass and a soundboard. The electromagnetic driver effects an alternating electromagnetic field in response to an input signal. The armature includes upper and lower substantially parallel planar suspension members which couple to the electromagnetic driver. The upper and lower substantially parallel planar suspension members each comprise a plurality of independent planar non-linear spring members arranged regularly about a central planar region within a planar perimeter region. The plurality of independent planar non-linear spring members are defined by members having maximum opposing widths tapering to minimum opposing widths at midpoints thereon, the maximum opposing widths being coupled to the central planar region and to the planar perimeter region. The magnetic motional mass is suspended between the upper and lower substantially parallel planar suspension members about the central planar region. The alternating electromagnetic field alternately moves the magnetic motional mass, wherein movement of the magnetic motional mass is transformed through the plurality of independent planar non-linear spring members and the electromagnetic driver into motional energy. The soundboard couples to the electromagnetic driver for coupling the motional energy to a user.

In a first aspect of the present invention a personal communication device comprises a housing having a portion thereof forming a soundboard, a receiver, a processing means and a dual mode transducer. The receiver is enclosed within the housing and receives and detects coded message signals transmitted thereto. The processing means processes the detected coded message signals The dual mode transducer includes an electromagnetic driver, and a resonant armature system. The electromagnetic driver couples to the soundboard and to the processing means and effects an alternating electromagnetic field in response to the processed coded message signals being coupled thereto. The resonant armature system couples to the electromagnetic driver, and comprises a magnetic motional mass attached to a central planar region about which are regularly arranged a plurality of independent planar non-linear spring members defined by members having maximum opposing widths tapering to minimum opposing widths at midpoints thereon arranged within a planar perimeter region. A plurality of independent planar non-linear spring members are arranged regularly about a central planar region within a planar perimeter region. The resonant armature system responds to the alternating electromagnetic field for alternately moving the magnetic motional mass. The motion induced is transformed through the plurality of independent planar non-linear spring members and the electromagnetic driver into motional energy which is coupled through the soundboard to a user.

BRIEF DESCRIPTION OF THE DRAWINGS

FIG. 3 is a top view of a planar non-linear spring member utilized in a dual mode transducer in accordance with the preferred embodiment of the present invention.

FIG. 4 is a cross-sectional view taken along line 1—1 of FIG. 3 in accordance with the preferred embodiment of the present invention.

FIG. 5 is a representation of a finite element stress analysis of the planar non-linear spring member of FIG. 3.

FIG. 10 is an orthogonal front view of a personal portable radiotelephone utilizing the dual mode transducer of FIGS. 6 and 7 in accordance with a preferred embodiment of the present invention.

FIG. 11 is a cross-sectional view taken along the line 3—3 of FIG. 10 showing the mounting of the dual mode transducer in the portable radiotelephone housing in accordance with the preferred embodiment of the present invention.

FIG. 12 is an electrical block diagram of the portable radiotelephone of

FIG. 10 utilizing the dual mode transducer in accordance with the preferred embodiment of the present invention.

DESCRIPTION OF THE PREFERRED EMBODIMENT

Figure 1:
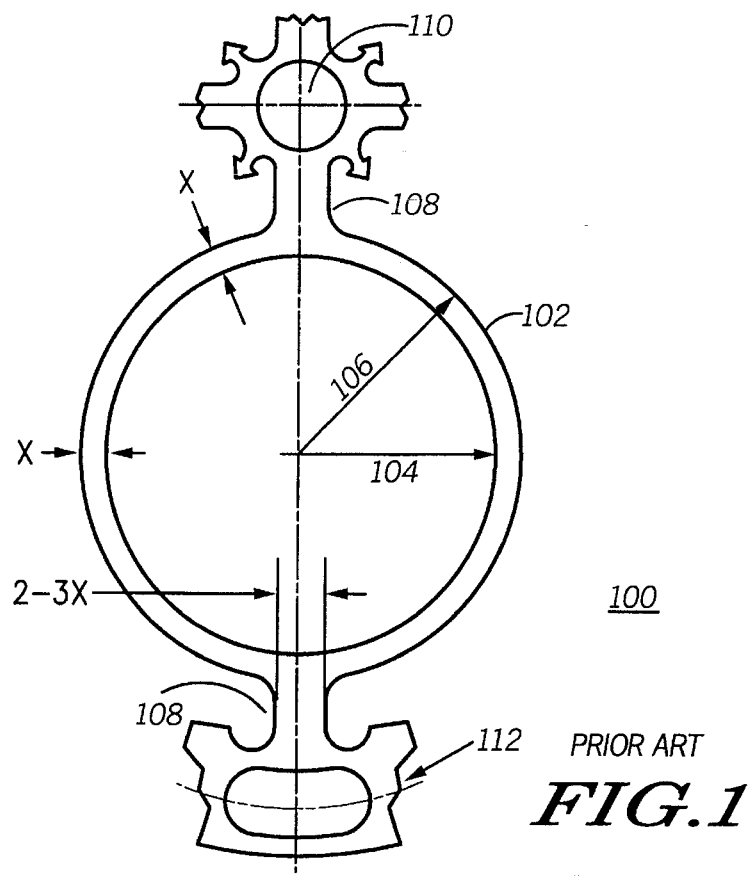
FIG. 1 is a top view of a prior art planar spring member utilized in an electromagnetic resonant vibrator.

With reference to FIG. 1, a top view of a prior art planar spring member 100 utilized in a prior art electromagnetic resonant vibrator is shown. The planar spring member 100 has a planar, circular spring member 102 having a circular inner diameter 104 and a circular outer diameter 106, thereby providing a spring member having a substantially uniform width "X". The circular spring member 102 couples through end restraints 108 of substantially uniform width "2-3X" to a central planar region 110 and to a planar perimeter region 112. The relative thickness of the planar spring member is small (approximately 0.25X) as compared to the width of the circular planar spring members 102.

Figure 2:
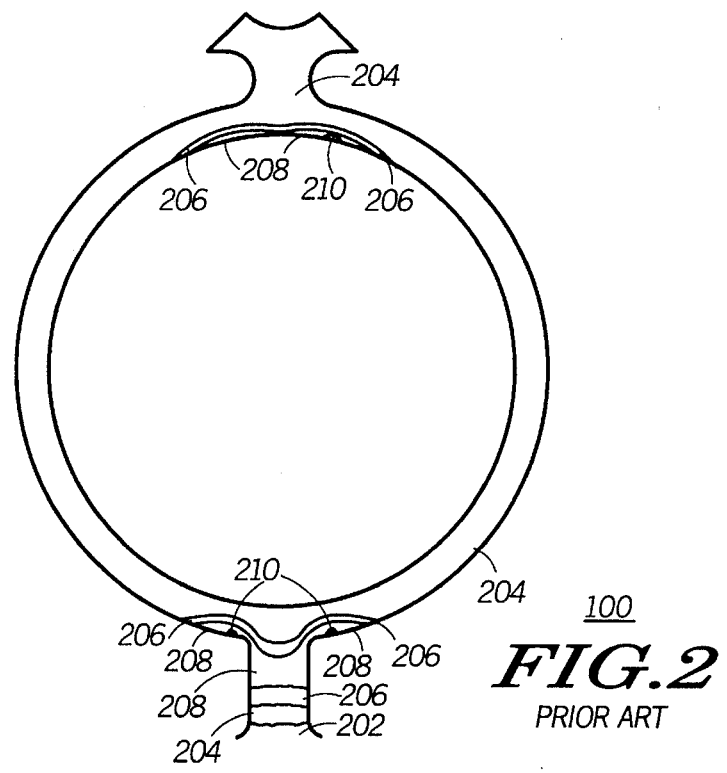
FIG. 2 is a representation of a finite element stress analysis of the prior art planar spring member of FIG. 1.

When an electromagnetic resonant vibrator is implemented using a plurality of planar spring member 100 such as is described in U.S. Pat. No. 5,107,540 issued Apr. 21, 1992 to Mooney et al, entitled "Electromagnetic Resonant Vibrator", the assignee of which is also the assignee of the present invention, the plurality of planar spring members provide a restoring force which is normal to the motion of the central planar region 110. The restoring forces result in stresses being established within the planar circular spring member 102 and the end restraints 108. FIG. 2 is a graphic representation of a finite element stress analysis of the prior art planar spring member of FIG. 1. The stress levels within each of the areas identified in FIG. 2 are defined in Table 1 below.

TABLE 1

| Reference Number | Stress psi |
| --- | --- |
| 202 | 0 |
| 204 | <9,000 (633 kg/sq. cm) |
| 206 | <12,000 (844 kg/sq. cm) |
| 208 | <23,000 (1617 kg/sq. cm) |
| 210 | <27,000 (1899 kg/sq. cm) |

As shown in FIG. 2, there is a relatively large stress concentration 208 located in the end restraint adjacent the planar perimeter region. It will be appreciated that proper selection of the material of the planar spring member 100 is critical to minimize fatigue and eventual failure of this end restraint.

FIG. 3 is a top view of an improved planar non-linear spring member utilized in a dual mode transducer, to be described below, in accordance with the preferred embodiment of the present invention. The planar non-linear spring member 300 has a planar, substantially circular spring member 302 having an elliptical inner diameter 304 and a circular outer diameter 306, thereby providing a spring member having a nonuniform width, the width "2X" being the widest in the region contiguous to the end restraints 308, and tapering to a width "X" about the midpoints 314 of the substantially circular planar spring members 302. The circular spring members 302 couple through end restraints 308 of substantially uniform width "2.57X" to a central planar region 310 and to a planar perimeter region 312.

FIG. 4 is a cross-sectional view taken along line 1—1 of FIG. 3 in accordance with the preferred embodiment of the present invention. As shown, the thickness of the improved planar non-linear spring member 300 is by way of example "0.43X" which is a smaller width to thickness ratio then provided in the prior art planar spring member 100 of FIG. 1. It will be appreciated that the dimension and thickness of the planar non-linear spring member 300 affect the resonant frequency at which the dual mode vibrator resonates.

FIG. 5 is a graphic representation of a finite element stress analysis of the improved planar non-linear spring member 300 of FIG. 3. The stress levels within each of the areas identified in FIG. 5 are defined in Table 2 below.

TABLE 2

| Reference Number | Stress psi |
| --- | --- |
| 502 | 0 |
| 504 | <9,000 (633 kg/sq. cm) |
| 506 | <12,000 (844 kg/sq. cm) |
| 508 | <23,000 (1617 kg/sq. cm) |

As shown in FIG. 5, the stress concentrations 504 located in the end restraint adjacent the planar perimeter region have been significantly reduced as compared to the prior art spring member shown in FIG. 1. As a result, it will be appreciated that fatigue of the end restraint is dramatically reduced such that there is less likelihood of eventual failure of the end restraint, as compared to the prior art planar spring member. The unique geometry of the planar non-linear spring member 300 provides enhanced operating performance above the fundamental resonant frequency range, as well as will be described in detail below.

Figure 6:
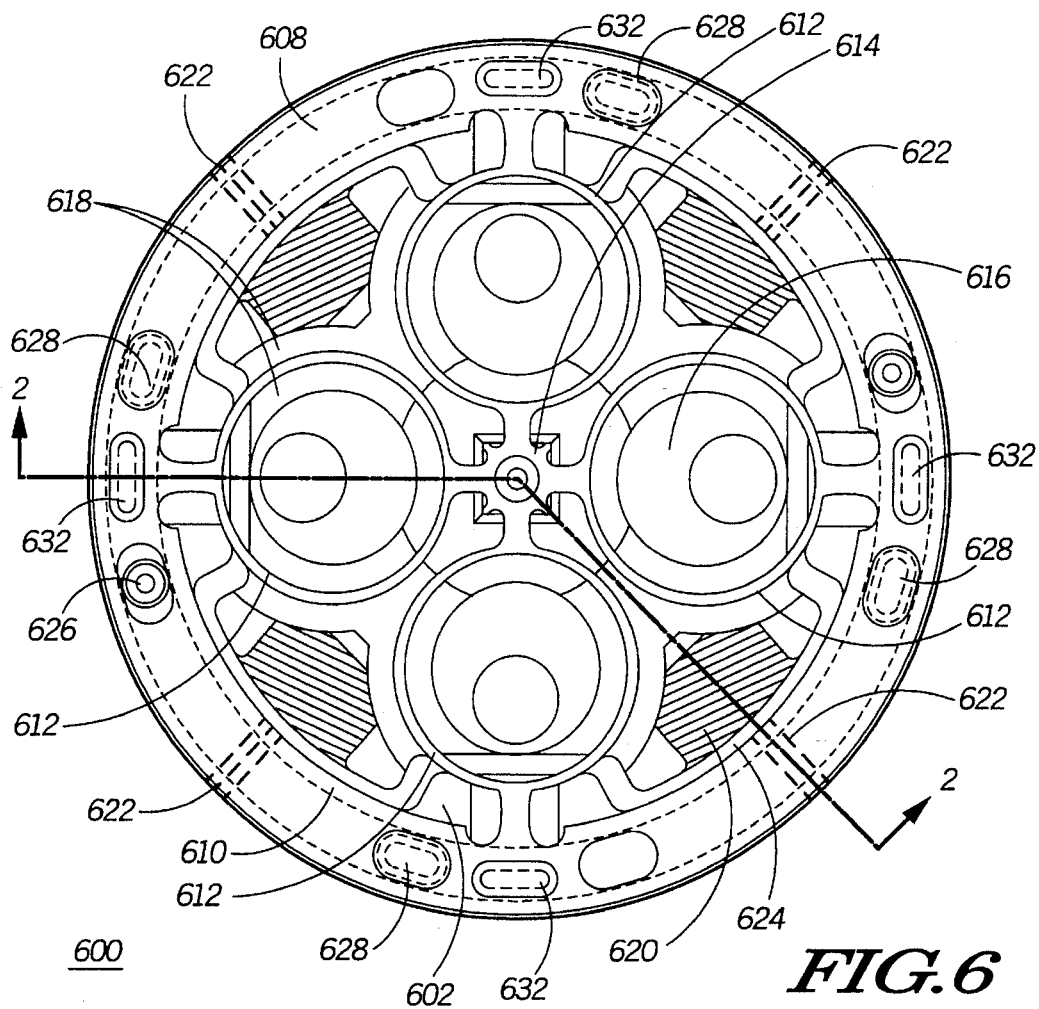
FIG. 6 is a top exploded view of the dual mode transducer in accordance with the preferred embodiment of the present invention.

FIG. 6 is an orthogonal top view of a dual mode transducer 600 (with circuit board 206 removed) in accordance with the preferred embodiment of the present invention.

Shown in FIG. 6 is a coil form 602 which by way of example is approximately 0.7 inch (17.78 mm) in diameter and which encloses an electromagnetic coil 604 (FIG. 7) which functions as an electromagnetic driver for generating an alternating magnetic field in response to an excitation signal, such as an audio input signal. The coil form 602 is manufactured using conventional double shot injection molding techniques using a plastic material, such as a thirty-percent glass-filled liquid crystal polymer which fully encloses the coil 604 except for terminals 626 which provide electrical connection to the coil 604. It will be appreciated that other plastic materials can be utilized for the coil form 602 as well. The coil form 602 establishes two planar perimeter seating surfaces 630 about a planar perimeter region 608 on which two planar suspension members 610 are supported, and further includes eight contiguously molded bosses 632 which are used to orient and affix the planar spring members 610 to the coil form 602 using a staking process, such as using heat or ultrasonics.

Each of the two planar suspension members 610 comprises four independent planar non-linear spring members 612 arranged regularly around a central planar region 614 which is used for positioning and fastening a moveable mass 616 to the two planar suspension members 610 also using a STAKING PROCESS. The planar non-linear spring members 612 are defined as having a circular outer perimeter and an elliptical inner perimeter such as described in FIG. 3 above. The planar suspension members 610 are manufactured from a sheet metal, such as Sandvik™ 7C27M02 stainless martensitic chromium steel alloyed with molybdenum, or a 17–7 PH heat treated CH900 precipitation-hardened stainless steel. It will be appreciated that other materials can be utilized as well. The sheet metal thickness is preferably 0.002 inch (0.0508 mm) thick, and the planar suspension members are formed preferably by chemical etching, or machining technique. The movable mass 616 is manufactured using conventional die casting techniques using a Zamak 3 zinc die-cast alloy, although it will be appreciated that other materials can be utilized as well.

The arrangement of the parts of the dual mode transducer 600 is such that the movable mass 616 can be displaced upwards and downwards in a direction normal to the planes of the two planar suspension members 610, the displacement being restricted by a restoring force provided by the independent planar non-linear spring members 612 in response to the displacement. The movable mass 616 is formed such that there are shaped channels 618 for allowing the movable mass 616 to extend through and around the independent planar non-linear spring members 612 during excursions of the movable mass 616, thereby providing a greater mass to volume ratio for the dual mode transducer 600 than would be possible without the shaped channels 618. A driving force for the movable mass 616 is produced by four radially polarized permanent magnets 620 attached to the movable mass 616 and magnetically coupled to the electromagnetic coil 604. The permanent magnet 620 are manufactured using Samarium Cobalt having a Maximum Energy Product of 28–33 and are magnetized to produce a coercive force of 8K–11K Oersteds. The two planar suspension members 610, the movable mass 616, and the four permanent magnets 620 comprise a resonant armature system for the dual mode transducer 600.

An additional detail shown in FIG. 6 comprises four radial projections 622 projecting in a direction normal to each surface (top and bottom) of the coil form 602 for compressively engaging with the planar perimeter region 608 of the top planar suspension member 610. The projections 622 pre-load the planar perimeter region 608 after the planar suspension member 610 is attached to the surface of the coil form 602 using bosses 632 located on either side of each of the protrusions 622. The bosses 632 are staked using heat or ultrasonics to secure the planar suspensions members 610 to the planar perimeter region 608 of the coil form 602. The purpose of preloading is for preventing audible (high frequency) parasitic vibrations during operation of the dual mode transducer 600.

Figure 7:
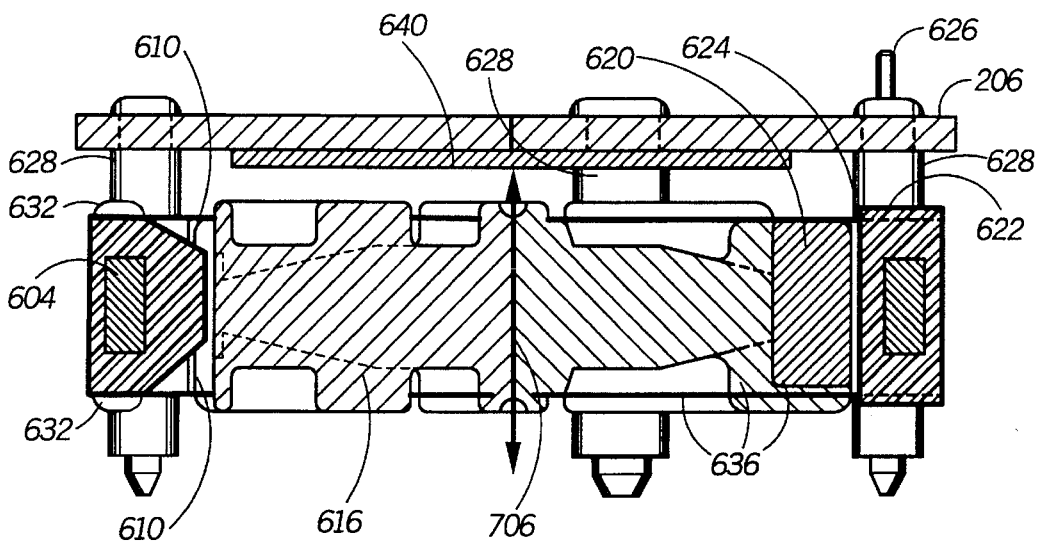
FIG. 7 is a cross-sectional view taken along the line 2—2 of FIG. 6 of the dual mode transducer in accordance with the preferred embodiment of the present invention.

With reference to FIG. 7, a cross-sectional view taken along the line 2—2 of FIG. 6 of the dual mode transducer in accordance with the preferred embodiment of the present invention clearly shows an air gap 624. The air gap 624 surrounds the movable mass 616 (partially shown), thus allowing the movable mass 616 to move in a direction normal to the planes of the two planar suspension members 610. During operation, the electromagnetic coil 604 generates an alternating magnetic field polarized in a direction parallel to an axis 706 through the center of the resonant armature system 636 which comprises the movable mass 616, the magnetic members 620 and the planar suspension members 610, at a frequency substantially the same as the fundamental resonant frequency of the resonant armature system 636. The alternating magnetic field is generated when a drive signal is coupled to the electromagnetic coil 604, the drive signal being preferably a swept low frequency drive signal to produce a tactile alert, or an audible drive signal to produce an audible response. The alternating magnetic field generated is magnetically coupled to the four permanent magnets 620 that are physically coupled to the movable mass 616. The magnetic coupling produces an alternating excitation force on the resonant armature system 636, and causes the resonant armature system 636 to vibrate with a displacement direction parallel to the axis 706 when the swept low frequency drive signal or the audible drive signal is provided. When the dual mode transducer 600 is installed in a device, e.g., a personal portable radiotelephone, such that the dual mode transducer 600 is oriented with the axis 706 normal to a user's body, a strong tactile response is advantageously generated with less power input to the dual mode transducer 600 than would be required by conventional vibrators. This increase in efficiency is obtained because the dual mode transducer 600 in accordance with the present invention overcomes many power wasting characteristics associated with earlier vibrator designs.

While the preferred embodiment according to the present invention uses the electromagnetic coil 604 interacting with the permanent magnets 620 for generating the alternating excitation force, other means, e.g., piezoelectric means, could be used as well for generating the alternating excitation force.

Figure 8:
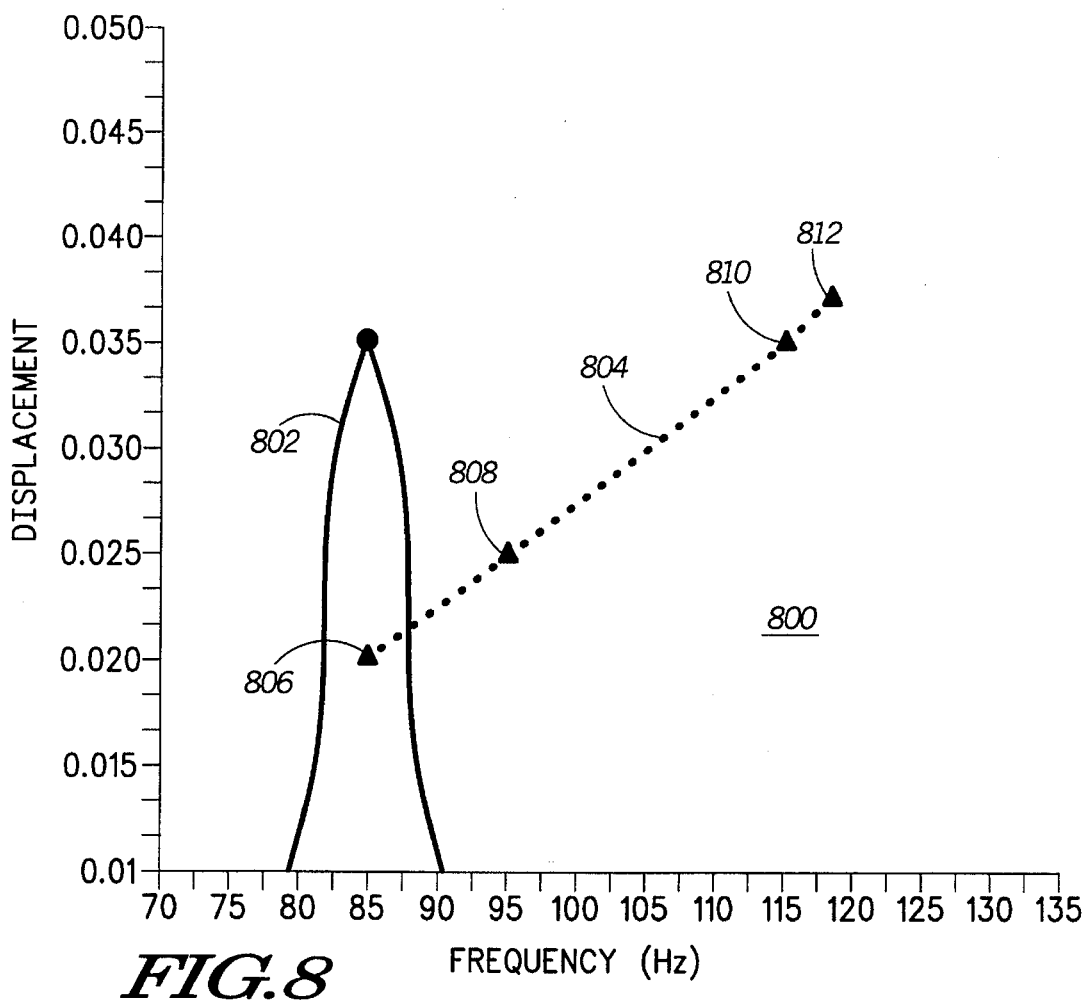
FIG. 8 is a graph comparing the amplitude versus fundamental frequency response of a linear resonant vibrator system and the dual mode transducer in accordance with the preferred embodiment of the present invention.

FIG. 8 is a graph 800 comparing the displacement versus fundamental frequency response of the dual mode transducer in accordance with the preferred embodiment of the present invention and an equivalent linear resonant vibrator system. A frequency response curve 802 is shown for the linear resonant vibrator system which is driven, for example, with an excitation voltage of 0.9 volts, and which in response thereto produces a peak displacement of 0.035 inches (0.89 mm) at a center driving frequency of 85 Hz and corresponds to an impulse output of 27 g's which is calculated from the following formula:

$$g's = 0.10235\ (d)(f)^3$$

where g is the impulse output generated by the system, d is the displacement of the vibrating mass, and f is the driving frequency.

As shown by the frequency response curve 802, the linear resonant vibrator system is high-Q, and the impulse output falls off rapidly on either side of the peak center frequency. Consequently, great care must be taken to insure the driving frequency is controlled to match the peak center frequency to maximize the impulse output. Any variation in driving frequency, and more particularly, in the response of the linear resonant vibrator system due to manufacturing tolerances can result in a significant reduction in the impulse output generated.

In contrast, the dual mode transducer in accordance with the preferred embodiment of the present invention is a hardening spring type resonant system and can provide a significant impulse output over a very broad range 804 of driving frequencies. Impulse outputs are tabulated below for the hardening spring type resonant system, when also driven as described above with the same excitation voltage of 0.9 volts as compared to the linear resonant vibrator system:

| Ref. | Impulse (g's) | Displacement (in./mm) | Driving Frequency (Hz) |
| --- | --- | --- | --- |
| 806 | 12 | 0.020/.51 | 85 |
| 808 | 24 | 0.025/.64 | 95 |
| 810 | 45 | 0.035/.89 | 115 |

Above point 812, the impulse output of the dual mode transducer falls off rapidly, as will be described below. As can be seen from the table above, a significantly higher impulse response can be achieved as compared to the linear resonant vibrator system without the restrictions on controlling the center driving frequency.

Figure 9:
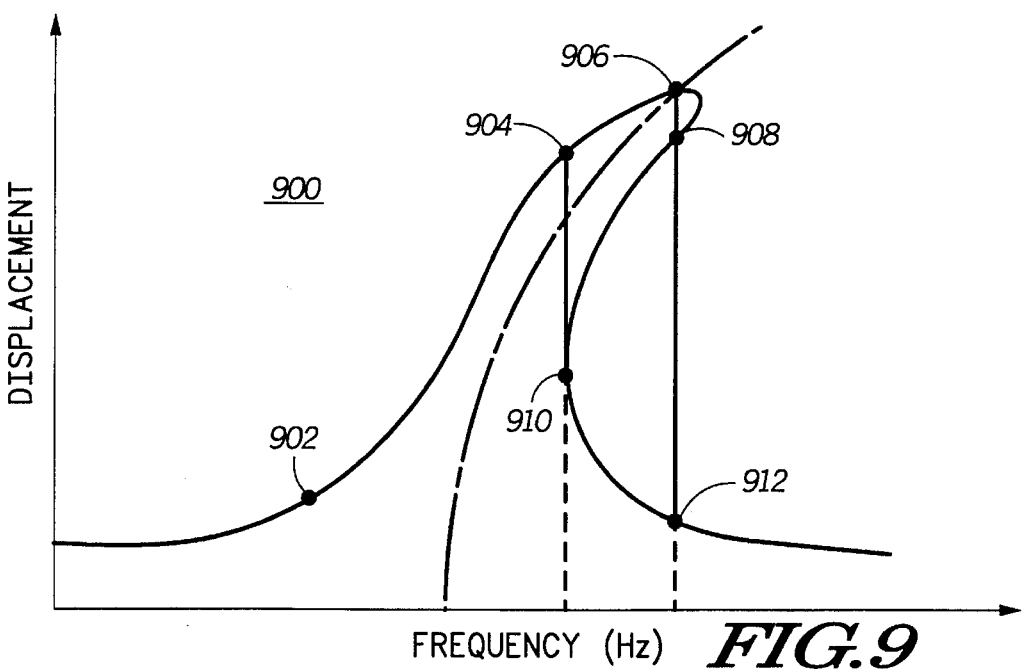
FIG. 9 is a graph depicting the impulse output as a function of frequency for a dual mode transducer utilizing a hardening spring type resonant system in accordance with the preferred embodiment of the present invention.

FIG. 9 is a graph 900 depicting the impulse output as a function of frequency for a dual mode transducer utilizing a non-linear, hardening spring type resonant system in accordance with the preferred embodiment of the present invention. Unlike a linear resonant vibrator system which requires a carefully controlled driving frequency to insure maximum impulse output, the dual mode transducer utilizing a non-linear, hardening spring type resonant system is preferably driven by a swept driving frequency, operating between a first driving frequency to provide a lower impulse output 902 and a second driving frequency to provide an upper impulse output 904. The upper impulse output 904 is preferably selected to correspond substantially to the maximum driving frequency at which there is only a single stable operating state. As can be seen from FIG. 9, two stable operating states 904 and 910 are possible when the driving frequency is set to that required to obtain impulse output 910, and as the driving frequency is increased therefrom, three stable operating states can exist, such as shown by example as impulse outputs 906, 908 and 912. It will be appreciated, that only those impulse responses which lie on the curve 900 between operating states 902 and 904 are desirable when utilizing the dual mode transducer 600 as a tactile alerting device because the impulse output is reliably maximized over that frequency range. As will be described below, those impulse responses which lie on the curve 900 above the operating state 912 are suitable for providing audible responses.

FIG. 10 is an orthogonal front view of a personal portable radiotelephone 1000 utilizing the dual mode transducer 600 shown in FIGS. 6 and 7 in accordance with a preferred embodiment of the present invention. The personal portable radiotelephone 1000, such as a Silverlink 2000 Personal Telephone manufactured by Motorola Inc., of Schaumburg, Ill, includes a housing 1002 for enclosing transceiver circuits utilized to provide two-way radio frequency communication with other personal portable radiotelephones or to a telephone coupled to a conventional telephone network. A keypad 1006, coupled to the housing 1002, allows the user to enter information, such as a telephone number or a password, and a display 1008 is provided to display the telephone number entered to be dialed or the password. A microphone 1010 is located within a hinged housing member 1004, and the dual mode transducer 600 is mounted to the upper portion 1016 of the housing 1002. The housing portion identified as 1014 functions as a soundboard, as will be described below, and has been cutaway in part to reveal the dual mode transducer 600. The dual mode transducer 600 functions in one mode as a tactile alerting device, and in a second mode as an audio range transducer. Transmission and reception of the two way radio communication signals is provided by an antenna 1018.

FIG. 11 is a cross-sectional view taken along the line 3—3 of FIG. 10 showing the mounting of the dual mode transducer 600 in the portable radiotelephone housing 1002 in accordance with the preferred embodiment of the present invention. The sound board 1014 is integrally molded as a part of the upper housing 1016 using conventional injection molding techniques and thermoset plastic materials. A ring 1102 having a substantially circular periphery is formed contiguously with the back of the sound board 1014, and is used to mount the dual mode transducer 600, as shown. The dual mode transducer 600 is attached at the perimeter 1106 of the coil form 608 to the ring 1102 and is preferably held in place using an adhesive, such as a cyanoacrylate or epoxy adhesive. The front surface of the sound board 1014 has a preferably concave profile to identify the position of the dual mode transducer 600, as there are no sound porting holes, as is required with a conventional acoustic transducer, such as an electromagnetic speaker. The soundboard 1014 has a generally uniform thickness which tapers to a reduced thickness at the periphery 1104 which contributes to the compliance of the soundboard 1014, thereby establishing the resonance of the soundboard 1014. When the magnetic motional mass 616, 620 is set into movement, the movement of the magnetic motional mass 616, 620 is transformed into tactile or acoustic energy through the planar non-linear spring members which couple to the electromagnetic driver, and which further in turn couples to the sound board 1014 through the ring 1102. The soundboard 1014 functions as an earpiece for the transmission of the tactile or acoustic energy to the user. The acoustic energy is delivered primarily by means of bone conduction when the housing is placed in contact with the user's ear, as will be described in further detail below.

Figure 12:
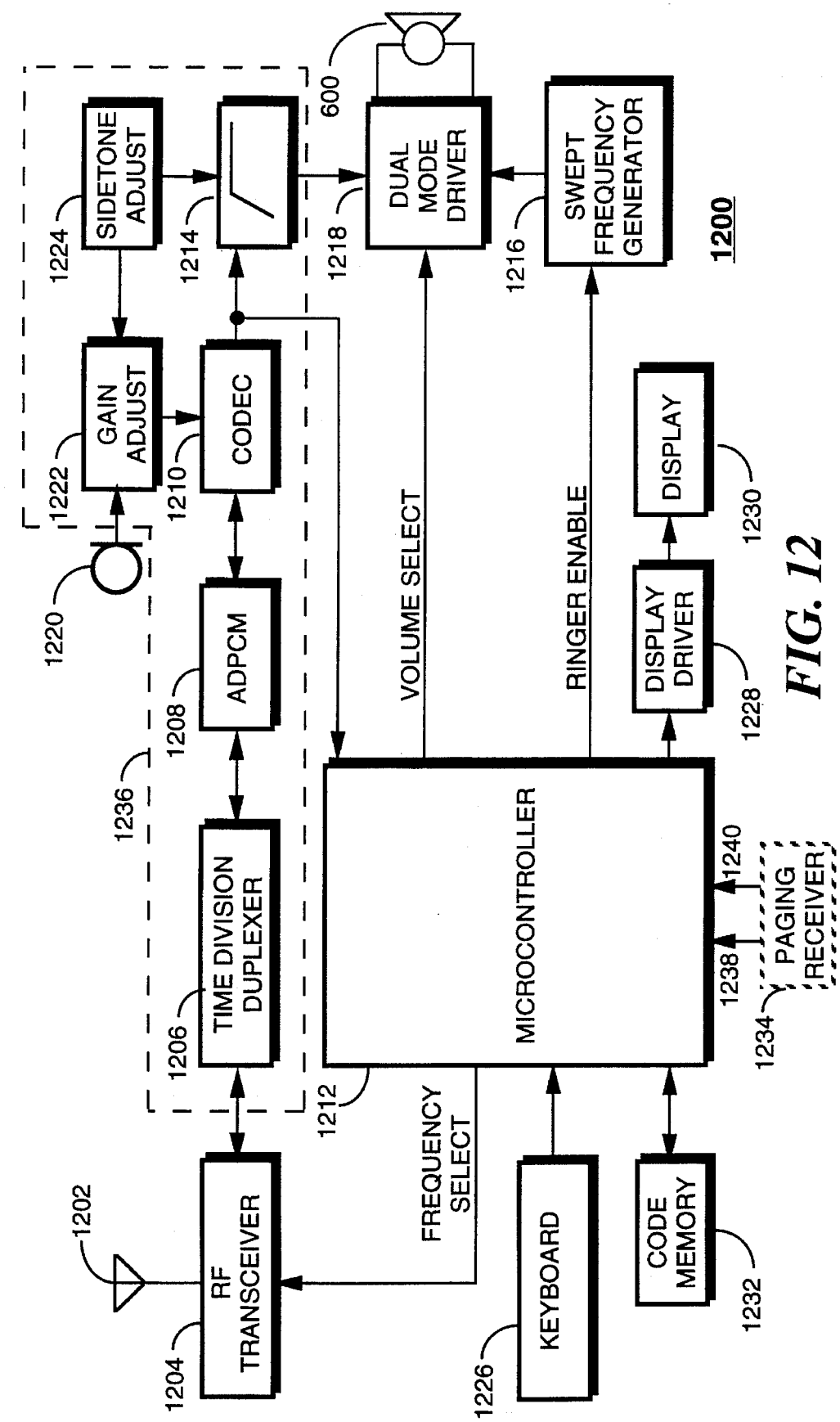

FIG. 12 is an electrical block diagram of the portable radiotelephone 1000 shown in FIG. 10 which utilizes the dual mode transducer 600 in accordance with the preferred embodiment of the present invention. In the preferred embodiment of the present invention, audio messages are transmitted over a radio frequency channel and received using a well known signaling protocol, such as the CT2 (Second Generation Cordless) Common Air Interface protocol in which audio signals are processed using adaptive differential pulse code modulation techniques and transmitted in a time division duplex manner. As shown in FIG. 12, transmitted audio message signals are intercepted by antenna 1202 and processed by radio frequency transceiver 1204 to provide a recovered audio message signal having time division duplexed information. A processing means 1236 comprising a time division duplexer 1206, an adaptive differential pulse code modulator/demodulator 1208 and a codec 1210 process the detected voice message signals, as will be described below. The time division duplexed audio message signals are processed by a time division duplexer 1206 which recovers the received channel information in the form of a 4-bit adaptive differential pulse modulated signal which is processed by the adaptive differential pulse code modulator/demodulator 1208 to produce an 8-bit pulse code modulated output. The 8-bit pulse code modulated signal is coupled to the input of a codec 1210 which converts the pulse code modulated signal into an analog signal representative of an audio ringer signal followed by the original audible voice message. The audio ringer signal is coupled to and detected by a ring detector circuit which is a function performed within the micro controller 1212. When the audio ringer signal is detected, a ringer enable signal is generated by the micro controller 1212 which is coupled to a swept low frequency signal generator 1216 which generates a swept sub-audible frequency signal. The swept sub-audible frequency signal is preferably swept repeatedly over a predetermined time interval, such as at 550 millisecond time intervals during the time in which the audio ringer signal is received. The frequency range of the swept sub-audible frequency signal is a function of the dual mode transducer design, and covers frequency ranges of typically from 70–110 Hz to 105–190 Hz. The frequency ranges are selected which provide the highest susceptibility to tactile stimulation to the device user.

Figure 13:
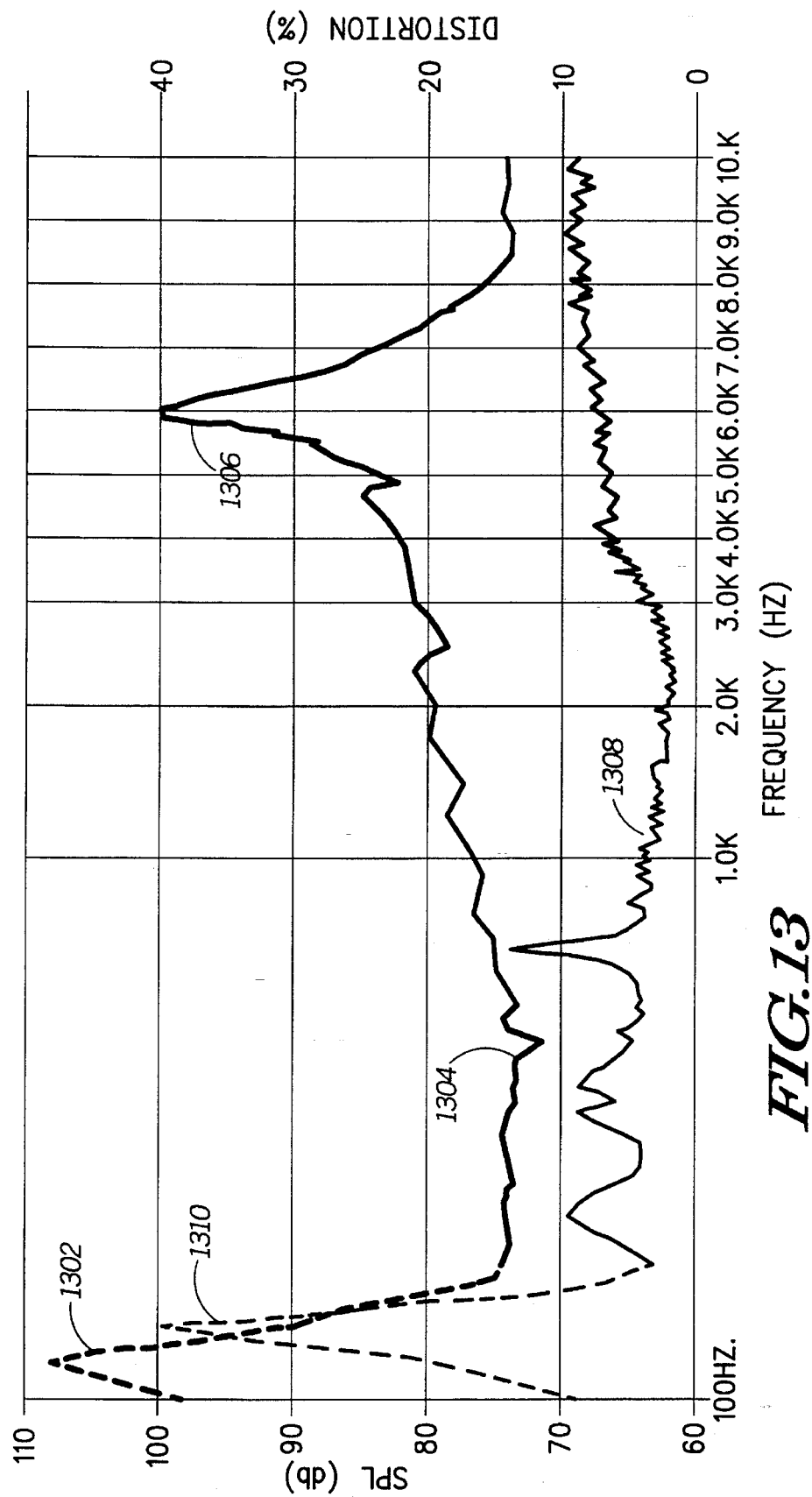
FIG. 13 is a graph showing the frequency response of the dual mode transducer in accordance with the preferred embodiment of the present invention.

The response of the dual mode transducer 600 to the swept sub audible frequency signal is shown in FIG. 13, which is a graph showing the overall frequency response of the dual mode transducer 600 in accordance with the preferred embodiment of the present invention. As the dual mode transducer 600 is swept over the sub audible frequency range, a prominent response 1302 is generated at the fundamental resonant frequency of the dual mode transducer 600, imparting significant tactile energy to the portable transceiver housing 1002. As the frequency input is increased, the tactile energy output drops rapidly, as previously described in FIG. 9. A relatively constant audible output 1304 is produced enabling the dual mode transducer 600 to function as an audible transducer over the received voice message frequency range. The dual mode transducer 600 output 1306 again peaks at a frequency determined by the sound board 1014 resonance, which as shown is on the order of 6 kilo-Hertz in the example shown. As can be seen in FIG. 13, the audible distortion 1308 remains relatively constant and low over the majority of the audible, or voice, message frequency range. As would be expected, the audible distortion peaks 1310 significantly at the fundamental resonant frequency of the dual mode transducer 600.

Returning to FIG. 12, in order to control the tactile response of the dual mode transducer 600, a high pass filter 1214 which is part of the processing means 1236 is placed in the received audio path, significantly attenuating those frequencies received within the audio message at the fundamental resonant frequency of the dual mode transducer. The filtered audible message signal is coupled to a dual mode driver circuit which amplifies and couples the audible message signal to the dual mode transducer.

A microphone 1220, gain adjust circuit 1222 and sidetone adjust circuit 1224 allow the portable transceiver user to deliver an audible message in a manner well known in the art. As with the received audible signal, the output of the sidetone adjust circuit 1224 is coupled to the dual mode transducer 600 through the high pass filter 1214 to prevent unwanted tactile responses by the dual mode transducer 600. The audible message generated by the microphone 1220 is processed through the codec 1210, the adaptive differential pulse code modulator 1208, the time division duplexer 1206 and the transmitter portion of the transceiver 1204 in a manner well known in the art. A keyboard 1226 is provided to allow entry of the telephone numbers of called parties or to review stored telephone numbers. The telephone number input is processed by the microcontroller 1212 which couples the telephone number information to a display driver 1228 for display on a display 1230, such as a liquid crystal display. A code memory 1232 stores a portable transceiver address and PIN number which are used by the micro controller to enable selectively contacting the portable transceiver 1200 when matching selective call address signals are received, and for enabling the portable transceiver 1200 to communicate with a telepoint base station in a manner well known in the art.

Unlike conventional portable radiotelephone handsets which decode the received ring signals to generate either a preset audible ring or chirp signal or a ramp-up audible ring or chirp signal to generate an audible ring to alert the user of an incoming phone call, the portable transceiver using a dual mode transducer 600 in accordance with the preferred embodiment of the present invention preferably generates a tactile alert. The tactile alert is advantageous in that when generated either for a newly received call, or as an alert for a "call-waiting" call, the alert signal is not intrusive, i.e. does not disrupt other persons in the vicinity of the user, and does not subject the user to a loud audible alert, should the portable transceiver be held to the user's ear during a conversation while a "call-waiting" alert is generated.

Figure 14:
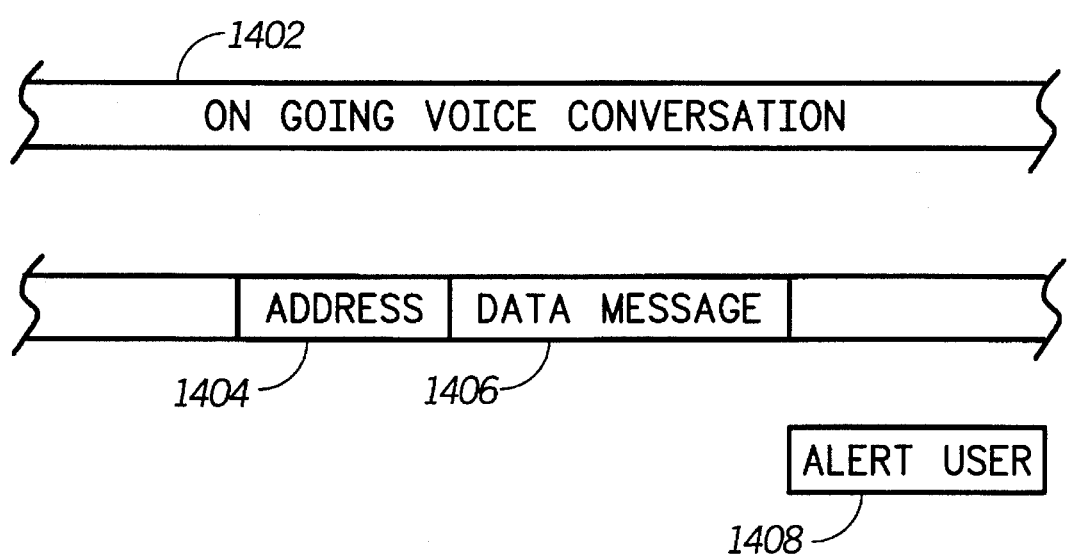

In an alternate embodiment of the present invention, a paging receiver 1234 can be coupled to the microcontroller to provide an indication of a "call waiting" message. When configured using the paging receiver, the user of the portable radiotelephone handset can be engaged in a telephone conversation 1402, as shown in FIG. 14. During the ongoing telephone conversation 1402, an address 1404 identifying the portable radiotelephone handset, and a corresponding numeric data message 1406 identifying the telephone number of a "call waiting" caller can be received by the paging receiver. The address and data message are handled in a manner well known by one of ordinary skill in the art, generating an alert enable signal 1238 shown in FIG. 12 and a received data signal 1240. The alert enable signal is processed by the microcontroller 1212 which results in generating a ringer enable signal, which is coupled to the swept frequency generator 1216 which, as described above, which then generates the swept sub-audible frequency signal 1408. The swept sub-audible frequency signal 1408 is coupled to the dual mode driver even as the ongoing telephone conversation 1402 is in progress, resulting in a tactile alert being generated alerting the user of a "call waiting" call simultaneously with the audio of the telephone conversation being carried on. Because the "call waiting" alert is tactile, control of the amplitude of the alerting signal is not critical, as is required when an audible alert signal is generated. The tactile alert signal has the additional advantage of being simultaneously generated with the ongoing telephone conversation, whereas the audible alert would result in an interruption of the ongoing telephone conversation. Once the telephone conversation is ended, the numeric data delivered by the received data signal can be processed by the microcontroller 1212, enabling the received telephone number to be displayed on the display

1230. Automatic dialing of the received telephone number can be accommodated using the keyboard 1226 in a manner well known in the art.

In summary, a dual mode transducer 600 has been described above which utilizes a plurality of non-linear planar spring members 612 which are defined by circular outer perimeters and elliptical inner perimeters to provide significantly improved spring member reliability during operation of the dual mode transducer 600. When mounted to a sound board such as provided in a portable radiotelephone transceiver, the dual mode transducer 600 is capable of providing both a tactile response for alerting the user of an incoming message, and also to provide an audible response over the frequency range of a received audible message signal, typically between 300 and 3000 Hertz. Unlike conventional speakers which require porting to provide an audible frequency message, the dual mode transducer 600 can deliver the audible message using a sound board which is not ported, thereby improving the reliability of the dual mode transducer by eliminating a number of well known environmental factors, such as dust and humidity, which degrades performance of a conventional speaker.

We claim:

1. A dual mode transducer, comprising:
    an electromagnetic driver, for effecting an alternating electromagnetic field in response to an input signal;
    an armature, including upper and lower substantially parallel planar suspension members, coupled to said electromagnetic driver, said upper and lower substantially parallel planar suspension members each comprising
    a plurality of independent planar non-linear spring members arranged regularly about a central planar region within a planar perimeter region, said plurality of independent planar non-linear spring members being defined by members having maximum opposing widths tapering to minimum opposing widths at midpoints thereon, said maximum opposing widths being coupled to said central planar region and to said planar perimeter region;
    a magnetic motional mass suspended between said upper and lower substantially parallel planar suspension members about said central planar region, and coupled to said alternating electromagnetic field for alternately moving said magnetic motional mass in response thereto, wherein movement of said magnetic motional mass is transformed through said plurality of independent planar non-linear spring members and said electromagnetic driver into motional energy; and
    a soundboard, coupled to said electromagnetic driver, for coupling the motional energy to a user.

2. The dual mode transducer in accordance with claim 1 wherein said maximum opposing widths tapering to minimum widths at midpoints thereon are defined by spring members having an elliptical inner perimeter and a circular outer perimeter.

3. The dual mode transducer in accordance with claim 1, wherein said maximum opposing widths are twice said minimum opposing widths.

4. The dual mode transducer in accordance with claim 1 wherein said electromagnetic driver and said planar perimeter region of said armature have a periphery which are substantially circular, and wherein said electromagnetic driver is coupled at said periphery to said soundboard.

5. The dual mode transducer in accordance with claim 1 wherein said plurality of independent planar non-linear spring members are in tension during movement of said magnetic motional mass.

6. The dual mode transducer in accordance with claim 1 wherein the motional energy generated by said magnetic motional mass in response to the alternating electromagnetic field is acoustic energy in response to an audio input signal being coupled to said electromagnetic driver.

7. The dual mode transducer in accordance with claim 6 wherein the motional energy generated by said magnetic motional mass in response to the alternating electromagnetic field is tactile energy in response to a sub-audible input signal being coupled to said electromagnetic driver.

8. The dual mode transducer in accordance with claim 7 wherein said armature and said magnetic motional mass have a fundamental frequency, and wherein the sub-audible input signal is a periodically swept subaudible frequency signal having a swept frequency range above the fundamental frequency.

9. The dual mode transducer in accordance with claim 1 wherein said armature and said magnetic motional mass have a fundamental frequency and displacement amplitude associated therewith.

10. The dual mode transducer in accordance with claim 9 wherein the displacement amplitude of said magnetic motional mass increases non-linearly over a predetermined frequency range above the fundamental frequency.

11. A personal communication device comprising:
    a housing having a portion thereof forming a soundboard;
    a receiver, enclosed within said housing, for receiving and detecting coded message signals transmitted thereto;
    processing means for processing the detected coded message signals; and
    a dual mode transducer including
        an electromagnetic driver, coupled to said soundboard and to said processing means, for effecting an alternating electromagnetic field in response to the processed coded message signals being coupled thereto, and
        a resonant armature system, coupled to said electromagnetic driver, and comprising a magnetic motional mass being attached to a central planar region about which are regularly arranged a plurality of independent planar non-linear spring members defined by members having maximum opposing widths tapering to minimum opposing widths at midpoints thereon arranged within a planar perimeter region,
        a plurality of independent planar non-linear spring members arranged regularly about a central planar region within a planar perimeter region,
        said resonant armature system being responsive to the alternating electromagnetic field for alternately moving said magnetic motional mass, wherein motion induced thereby being transformed through said plurality of independent planar non-linear spring members and said electromagnetic driver into motional energy which is coupled through said soundboard to a user.

12. The personal communication device according to claim 11, wherein said coded message signals include at least an address signal associated therewith, and wherein said processing means comprises
    a controller, responsive to the detected address signal matching a predetermined personal communication device address, for generating a subaudible alerting signal being coupled to said electromagnetic driver for effecting an alternating electromagnetic field in response thereto;

wherein the induced motion of said magnetic motional mass is transformed through said plurality of independent planar non-linear spring members and said electromagnetic driver into tactile energy to provide a vibratory response which is coupled through said soundboard to the user.

13. The personal communication device according to claim 12, wherein said coded message signals further include a voice message signal associated with the received address, and wherein said processing means processes the detected voice message signal which is coupled to said electromagnetic driver for effecting the alternating electromagnetic field in response thereto, wherein the induced motion of said magnetic motional mass is transformed through said plurality of independent planar non-linear spring members and said electromagnetic driver into acoustic energy to provide an audible response which is coupled through said soundboard to the user.

14. The personal communication device according to claim 13 wherein said processing means comprises a high pass filter to attenuate received voice message signals below 150 Hz.

15. The personal communication device according to claim 14 wherein said dual mode transducer generates tactile energy when excited by a swept frequency burst between 80 Hz and 110 Hz.

16. The personal communication device according to claim 14 wherein said dual mode transducer generates acoustic energy when excited by frequencies between 300 Hz and 3000 Hz.

17. The personal communication device according to claim 13, wherein said coded message signals further include a call waiting signal interleaved with the voice message signal, and wherein said processing means processes the call waiting signal and the voice message signal, wherein the induced motion of said magnetic motional mass is transformed through said plurality of independent planar non-linear spring members and said electromagnetic driver into tactile and acoustic energy to provide both vibratory and audible responses which are coupled through said soundboard to the user.

18. The personal communication device according to claim 11, wherein said soundboard has a circular shape, and wherein said electromagnetic driver has a periphery which is substantially circular, whereby said electromagnetic driver is coupled at said periphery to said soundboard.

19. The personal communication device according to claim 18, wherein said soundboard having a circular shape has a center and an edge, and wherein said soundboard tapers from said center to said edge.

20. The dual mode transducer in accordance with claim 11 wherein said maximum opposing widths tapering to minimum widths at midpoints thereon, and are defined by spring members having an elliptical inner perimeter and circular outer perimeter, and wherein said plurality of independent planar non-linear spring members are coupled to said central planar region and said planar perimeter region at said maximum opposing widths.

21. The dual mode transducer in accordance with claim 20, wherein said maximum opposing widths are twice said minimum opposing widths.

* * * * *